(12) United States Patent
Themelis

(10) Patent No.: US 10,989,905 B2
(45) Date of Patent: Apr. 27, 2021

(54) INTERCHANGEABLE OPTICAL MODULE AND MICROSCOPIC APPARATUS COMPRISING SAME

(71) Applicant: LEICA INSTRUMENTS (SINGAPORE) PTE. LTD., Singapore (SG)

(72) Inventor: George Themelis, Lindau (DE)

(73) Assignee: Leica Instruments (Singpore) Pte. Ltd., Singapore (SG)

( * ) Notice: Subject to any disclaimer, the term of this patent is extended or adjusted under 35 U.S.C. 154(b) by 205 days.

(21) Appl. No.: 16/305,405

(22) PCT Filed: May 26, 2017

(86) PCT No.: PCT/SG2017/050272
§ 371 (c)(1),
(2) Date: Nov. 29, 2018

(87) PCT Pub. No.: WO2017/209691
PCT Pub. Date: Dec. 7, 2017

(65) Prior Publication Data
US 2020/0124835 A1    Apr. 23, 2020

(30) Foreign Application Priority Data
Jun. 3, 2016 (EP) .................................. 16172829

(51) Int. Cl.
*G02B 21/18* (2006.01)
*G02B 7/02* (2021.01)
(Continued)

(52) U.S. Cl.
CPC ............. *G02B 21/18* (2013.01); *G02B 7/006* (2013.01); *G02B 7/021* (2013.01); *G02B 7/14* (2013.01); *G02B 21/16* (2013.01)

(58) Field of Classification Search
None
See application file for complete search history.

(56) References Cited

U.S. PATENT DOCUMENTS 4,753,525 A * 6/1988 Gaul ..................... G02B 21/088
359/388
6,226,118 B1 5/2001 Koyama et al.
(Continued)

FOREIGN PATENT DOCUMENTS

DE  10 2012 017 917 A1   3/2014
JP       H07199081 A      8/1995
(Continued)

*Primary Examiner* — Derek S. Chapel
(74) *Attorney, Agent, or Firm* — Hodgson Russ LLP

(57) ABSTRACT

An interchangeable optical module (1) for a microscopic or an endoscopic apparatus, in particular for a fluorescence microscope, includes at least one optical element (2), such as a beam-splitter (3), at least one beam path (B1, B2), in which the at least one optical element (2) is arranged, and at least one optical filter (5) which is arranged in the at least one beam path (B1, B2). A microscopic apparatus includes at least one receptacle for receiving at least one interchangeable optical module (1) as stated above. In order to allow different measurement techniques in one apparatus and to easily change the setup, it is intended that the optical module (1) further includes at least one refractive element (7) which is arranged in the at least one beam path (B1, B2).

13 Claims, 1 Drawing Sheet

Figure 1:
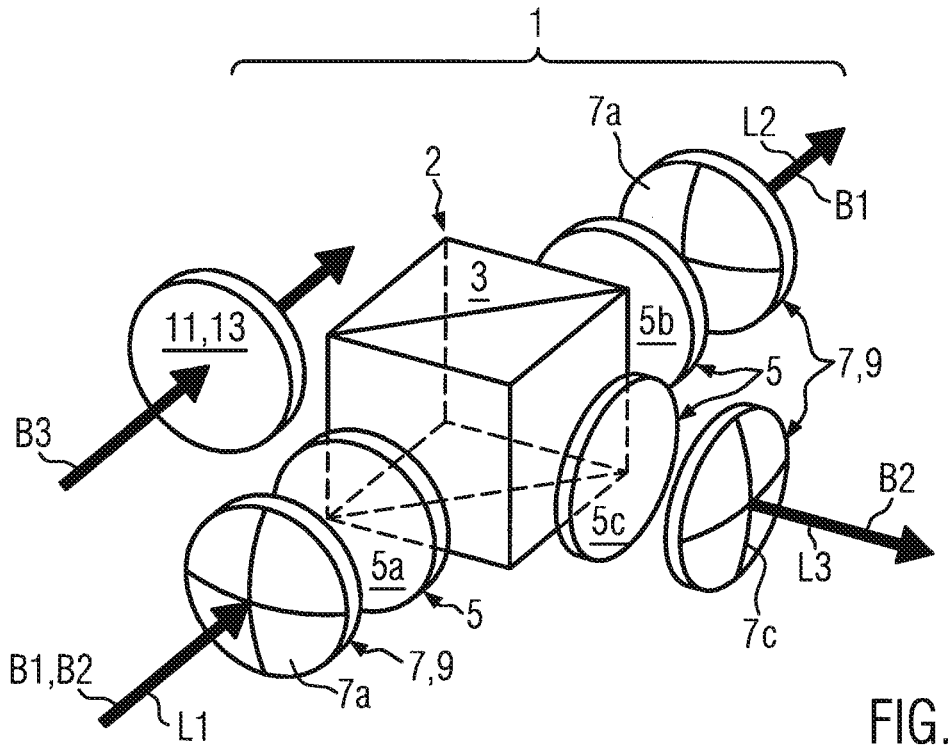

(51) Int. Cl.
  *G02B 7/14* (2021.01)
  *G02B 7/00* (2021.01)
  *G02B 21/16* (2006.01)

(56) References Cited

U.S. PATENT DOCUMENTS

| | | |
|---|---|---|
| 2003/0021018 A1 | 1/2003 | Birk et al. |
| 2003/0231791 A1* | 12/2003 | Torre-Bueno ......... G06T 7/0012 |
| | | 382/133 |
| 2004/0190133 A1 | 9/2004 | Engelhardt et al. |
| 2005/0161593 A1 | 7/2005 | Kitahara |
| 2008/0043324 A1 | 2/2008 | Lytle et al. |
| 2008/0068708 A1 | 3/2008 | Shirota |
| 2009/0195866 A1* | 8/2009 | Kawaski ............ G01N 21/6458 |
| | | 359/385 |
| 2011/0284767 A1 | 11/2011 | Wolleschensky et al. |
| 2016/0209646 A1 | 7/2016 | Hattori et al. |

FOREIGN PATENT DOCUMENTS

| | | |
|---|---|---|
| JP | H11149046 A | 6/1999 |
| JP | 2000098250 A | 4/2000 |
| JP | 2001296626 A | 10/2001 |
| JP | 2009529948 A | 8/2009 |
| JP | 2014153221 A | 8/2014 |
| WO | 2015182641 A1 | 12/2015 |

\* cited by examiner

INTERCHANGEABLE OPTICAL MODULE AND MICROSCOPIC APPARATUS COMPRISING SAME

CROSS-REFERENCE TO RELATED APPLICATIONS

The present application is the U.S. national phase of International Application No. PCT/SG2017/050272 filed May 26, 2017, which claims priority of European Application No. 16172829.0 filed Jun. 3, 2016, the entire disclosure of which is incorporated herein by reference.

FIELD OF THE INVENTION

The invention is related to an interchangeable optical module for a microscopic or an endoscopic apparatus, such as a fluorescence microscope, the module including at least one optical element, such as a beam-splitter, at least one beam path in which the at least one optical element is arranged, and at least one optical filter which is arranged in the at least one beam path. The invention is further related to a microscopic apparatus comprising at least one receptacle for receiving at least one interchangeable optical module according to the invention.

BACKGROUND OF THE INVENTION

Modern optical apparatuses such as microscopes or endoscopes, in particular fluorescence microscopes or endoscopes, make use of a variety of advanced optical technologies. However, these technologies differ strongly and require each a major adaptation of the microscopic or endoscopic apparatus. Even if using the same technology, but different optical properties, such as different spectral ranges, it may be difficult to apply these properties in the same optical instrument.

SUMMARY OF THE INVENTION

The object of the invention is therefore to overcome these drawbacks and to facilitate adaptation of the microscopic or endoscopic apparatus for using different optical technologies and/or properties in a single microscopic or endoscopic apparatus.

For the interchangeable optical module as mentioned in the beginning, this object is reached in that the interchangeable optical module further includes at least one refractive element which is arranged in the at least one beam path.

For the microscopic apparatus as mentioned in the beginning, the object is reached in that the apparatus comprises at least one receptacle for receiving at least one interchangeable optical module according to the invention.

The solution according to the invention has several advantages over the prior art and solves the above mentioned problems. The interchangeable optical module includes at least one refractive element, such as a lens, which allows to adopt the at least one beam path of the module to the microscopic or endoscopic apparatus. This solution therefore allows to include optical elements which are needed for the application of an optical technology directly inside the interchangeable optical module. This widens the range of optical technologies which may be applied in a microscopic apparatus. The inclusion of the optical elements in the module allows to easily change the module repeatedly, in particular by personnel without special training and without the need for special tools.

In the following, further improvements of the invention are described. The additional improvements may be combined independently of each other, depending on whether a particular advantage of a particular improvement is needed in a specific application.

According to a first advantageous improvement, the optical element may be a beam splitter. In such case, the interchangeable module may in particular be used for fluorescence microscopy and other advanced techniques which require the presence of a beam splitter. However, the invention is not limited to a beam splitter as first optical element. The optical element may, just by way of example, also be a mirror.

According to another advantageous improvement, the interchangeable optical module may comprise three optical filters functionally coupled to the optical element, one entrance filter and two outlet filters. This is especially beneficial in the case that the optical element is a beam splitter. The outlet filters may be part of beam paths which lead to cameras when the module is inserted in an apparatus. Each of these filters may be coupled to a refractive element. This filter arrangement allows the usage of the optical module for modern fluorescence techniques, such as super resolution microscopy, for example stimulated emission depletion (STED) microscopy.

The module may further comprise a mounting structure to which the at least one optical element, the at least one optical filter and the at least one refractive element are attached. The mounting structure may carry these optical components and may secure their relative position to each other inside the module. The mounting structure may thereby make it possible, that the interchangeable optical module with its included optical components may be handled as a single piece.

According to an advantageous improvement of the mounting structure, the mounting structure may be a cage which includes the at least one optical element, the at least one optical filter and the at least one refractive element. The cage may protect these optical components inside and may also comprise housing-like wall sections which allow a safe handling of the module without bearing the risk of touching any optical component with an operators hand or a tool. A cage may of course provide openings, which open all necessary beam paths of the module.

In order to facilitate insertion of the interchangeable optical module into an apparatus, the mounting structure may comprise at least one guiding element for guiding the module along an insertion path during connection to the microscopic or endoscopic apparatus. The at least one guiding element may, according to a further improvement, be also adapted for facilitating positioning of the module in an apparatus. For example, the at least one guiding element may taper in an insertion direction.

The at least one guiding element may be formed by at least one rail. Thereby, the at least one guiding element may be formed by a simple but reliable structure.

For easy insertion of the module, the insertion path may be arranged perpendicular to at least one beam path in the module.

The interchangeable optical module may also comprise at least one positioning element which allows aligning the position of the module in a microscopic apparatus relative to the same. Such element may be, for example, a screw or an actuator.

According to another advantageous improvement, the module may comprise at least one further optical element for at least one further beam path, which does not pass through the at least one optical element such as the beam splitter. A further beam path may widen the range of possible applications. For example, the further beam path may be an illumination path, especially for fluorescence microscopy. The further beam path may also comprise at least one optical filter and/or at least one refractive element. The further beam path may also comprise additional optical elements which may be needed for the application of a certain technique. In the case that the at least one further beam path is an illumination path, for example for fluorescence microscopy, the module may comprise an arrangement of optical elements which allows the illumination light to pass the further beam path undisturbed, but which blocks the wavelength of the illumination light by at least one filter which is connected to the at least one beam-splitter. It should also be noted that additional further beam paths may exist for which the module may carry additional optical elements.

The beam path and/or the further beam path may comprise optical components such as a sensor, for example a CCD, a CMOS or a photodiode. Further, at least one of the beam paths may comprise or may be coupled to a spectrometer, wherein the coupling may be established by fiber optics.

The interchangeable optical module according to the invention, especially when more than one beam path is present, may be applied for a variety of advanced optical technologies such as fluorescence-fluorescence, where multiple fluorophores and/or two or more spectral bands are used; reflectance-fluorescence, where one or more spectral bands for fluorescence microscopy are used in combination with color reflectance microscopy; and reflectance-reflectance, where two or more reflectance images are combined. Of course, the invention is not limited to the aforementioned techniques. For all techniques used, the module may carry the necessary optical elements. If necessary, the module may include polarizers, glass substrates, actuators, light sensitive sensors and/or irises.

The module may further comprise at least one data storage medium. The data storage medium may carry identifying information about the module and/or about the optical elements therein. It is also possible to provide calibration data or other necessary information about the module and/or the optical elements. The information provided in the data storage medium can, for example, be used for automatically adapting the microscopic apparatus to the module. Thereby, a laborious calibration procedure by technically trained personnel can be avoided.

In order to easily access information stored on the at least one data storage medium, the at least one data storage medium may be adapted to be accessible from outside the module. This can easily be achieved by electrical connectors which are accessible from outside the module. Another possible way of accessing the data storage medium may be the use of wireless technologies, for example RFID or other appropriate technologies.

According to another advantageous improvement, at least one optical component of the module may be tunable. This improvement may allow the adjustment of the optical set-up in the module or to change optical properties during measurements. In order to control the tuning of the at least one optical component, the interchangeable optical module may comprise connection elements such as electrical connectors or wireless transmitters. These connection elements may either communicate with the microscopic apparatus or with an external control unit, such as a computer.

The position of at least one of the optical components may be adjustable in order to align the components relatively to each other. For example at least one refractive element may be movable along its optical axis.

The microscopic apparatus as mentioned in the beginning may further be improved in that the apparatus comprises at least one complementary guiding element, adapted to interact with at least one guiding element of the optical module. The complementary guiding element and the guiding element of the module may interact during insertion of the module into the apparatus in such a way that the module is guided towards a working position. Further, the at least one complementary guiding element may be adapted for positioning the module during insertion. For example, the apparatus may comprise a locking for a latching mechanism which allows positioning the module in a working position.

In order to interact with the at least one data carrier unit of a module according to the invention, the apparatus may comprise at least one data processing system which is connectable to at least one data storage medium and/or at least one tunable optical element of the optical module.

To provide a microscopic apparatus which is capable of performing measurements using different optical techniques or measurements with different spectral ranges, the apparatus may further comprise at least two interchangeable optical modules with different optical properties.

In the following, the invention and its improvements are described in greater details using an exemplary embodiment and with reference to the figures. As described above, the various features shown in the embodiment may be used independently of each other in specific applications.

BRIEF DESCRIPTION OF THE DRAWING VIEWS

In the following figures, elements having the same function and/or the same structure will be referenced by the same reference signs.

Figure 2:
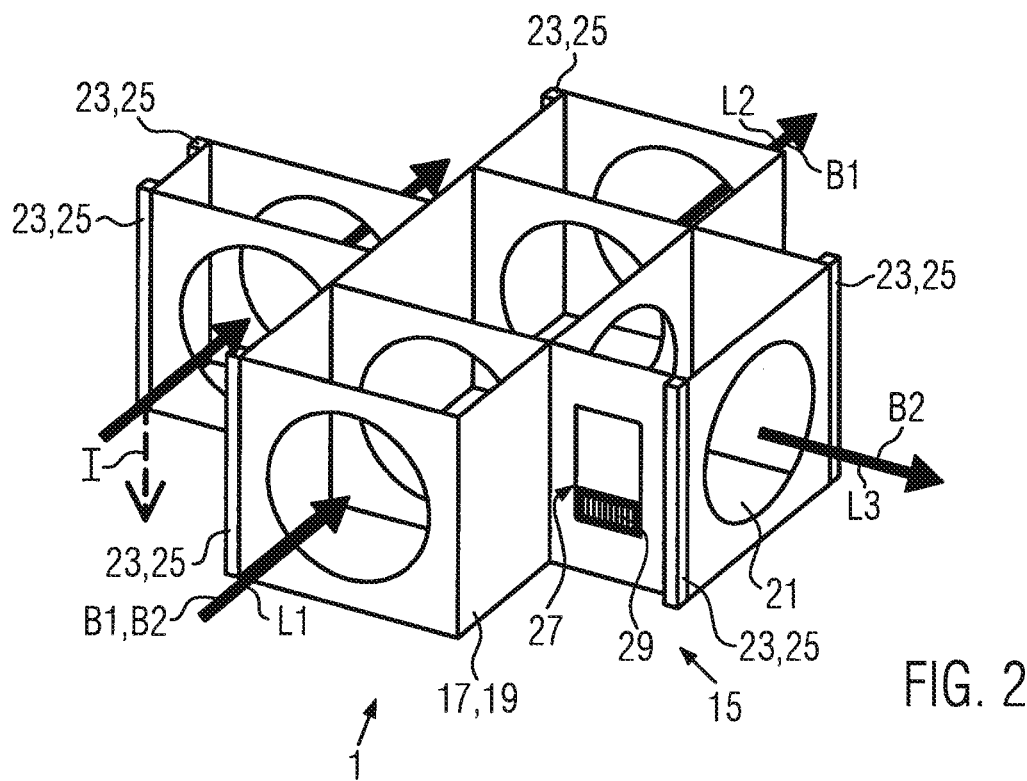

In the drawings:

FIG. 1 shows optical elements of an interchangeable optical module according to the invention; and FIG. 2 a cage-like mounting structure for carrying the set of optical elements as shown in FIG. 1.

DETAILED DESCRIPTION OF THE INVENTION

In the following, an interchangeable optical module 1 according to the invention is described with respect to FIGS. 1 and 2. For the sake of brevity, the interchangeable optical module 1 is named module 1 in the following.

The module 1 comprises an optical element 2. Just by way of example, the optical element 2 in the shown embodiment is a beam-splitter 3.

The module 1 further comprises three optical filters 5, which are functionally coupled to the beam-splitter 3. One optical filter 5a serves as an entrance filter 5a, whereas the optical filters 5b and 5c serve as outlet filters 5b and 5c for the beam-splitter 3.

For example, the entrance filter 5a may be used to select a spectral range of incoming light (indicated by arrow L1) before it reaches the beam-splitter 3. The outlet filters 5b and 5c may be used to select spectral ranges for outgoing light (indicated by arrows L2 and L3), which exits the beam-splitter 3. The outgoing light L2 and L3 may be directed towards two cameras (not shown).

The module 1 comprises three refractive elements 7, each formed by a lens 9. The refractive elements 7 are arranged in a way that each optical filter 5 is coupled to one refractive element 7. In detail, one refractive element 7a is arranged in a way that incoming light L1 reaches the entrance filter 5a through the refractive element 7a. The outgoing light L2 exits outlet filter 5b through the refractive element 7b and the outgoing light L3 axis outlet filter 5c through refractive element 7c.

Two beam paths, B1 and B2 exist, which intersect the beam-splitter 3. Beam path B1 follows arrows L1 and L2 and beam path B2 follows arrows L1 and L3.

Beam path B1 intersects refractive element 7a, entrance filter 5a, beam splitter 3, outlet filter 5b and refractive element 7b. Beam path B2 intersects refractive element 7a, entrance filter 5a, beam splitter 3, outlet filter 5c and refractive element 7c.

The module 1 comprises a further optical element 11. Just by way of example, the further optical element 11 is formed as an illumination filter 13. This setup may be applicable for multispectral fluorescence or reflectance imaging microscopy. A further beam path B3 extends through the illumination filter 13. As already mentioned, additional beam paths (not shown) may be present where applicable.

Optical elements in the module 1 may be tunable. For example, the optical filters 5 may be tunable filters. Of course, the module 1 may also comprise further optical elements such as polarizers, substrates, irises which may also be tunable.

The module 1 comprises a mounting structure 15. The optical elements as shown in FIG. 1 are preferably attached to the mounting structure 15 in such a way, that their relative position to each other is fixed.

Preferably, the mounting structure 15 is formed by a cage 17. The cage 17 may protect the optical elements which are arranged inside. The cage 17 may form a housing 19 which surrounds the optical elements in the module 1 at least partially. Openings 21 may be present to allow light to enter and exit the module 1.

The mounting structure 15 comprises guiding elements 23 for guiding the module 1 along an insertion path (indicated by arrow I) during connection to a microscopic or endoscopic apparatus. The guiding elements 23 are preferably formed by rails 25.

The rails 25 may have an overall linear shape. Alternatively, the rails 25 may have a curvature. The shape of the rails 25 depends on counter guiding elements in an apparatus (not shown) which are intended to interact with the guiding elements 23.

For easily mounting the module 1 in an apparatus, the insertion path I is arranged perpendicular to the beam paths B1, B2 and B3.

Preferably, the module 1 comprises at least one data storage medium 27 which may be attached to the mounting structure 15. The data storage medium 27 may contain information about the optical elements in the module 1. For example, the data storage medium 27 may comprise identifying information such as part numbers of the optical elements or of the module 1. It is also possible to provide further information in the data storage medium 27, such as calibration data which may be needed for analyzing experimental data obtained by using the module 1.

The data storage medium 27 is accessible from outside the module 1. As shown in FIG. 2, the data storage medium 27 may be provided with electrical connectors 29. Through the electrical connectors 29, the data which is stored in the data storage medium 27 can be accessed when the module 1 is inserted in an apparatus. Alternatively, the module 1 may comprise a data storage medium 27 which is accessible without the need for electrical connectors 29, for example by wireless technologies, such as RFID or others.

REFERENCE NUMERALS

1 Interchangeable optical module
2 Optical element
3 Beam splitter
5 Optical filter
5a Entrance filter
5b, 5c Outlet filter
7 Refractive element
7a Refractive element
7b Refractive element
7c Refractive element
9 Lens
11 Further optical element
13 Illumination filter
15 Mounting structure
17 Cage
19 Housing
21 Opening
23 Guiding element
25 Rail
27 Data storage medium
29 Electrical connector
B1, B2 Beam path
B3 Further Beam Path
I Insertion path
L1 Incoming light
L2, L3 Outgoing light

The invention claimed is:

1. An interchangeable optical module (1) for a microscopic or an endoscopic apparatus, the optical module (1) comprising:
   at least one optical element (2) which is a beam-splitter (3),
   at least one beam path (B1, B2) in which the beam-splitter (3) is arranged, wherein the at least one beam path comprises a first beam path (B1) and a second beam path (B2),
   at least one further beam path (B3) which differs from the first beam path (B1) and the second bream path (B2);
   at least one optical filter (5) arranged in the at least one beam path (B1, B2), wherein the at least one optical filter comprises an entrance filter (5a), a first outlet filter (5b), and a second outlet filter (5c) which are functionally coupled to the beam-splitter (3),
   wherein the first beam path (B1) intersects the entrance filter (5a), the beam-splitter (3), and the first outlet filter (5b),
   wherein the second beam path (B2) intersects the entrance filter, the beam-splitter (3), and the second outlet filter (5c),
   at least one refractive element (7) arranged in one of the first beam path (B1) and the second beam path (B2); and
   at least one further optical element (11) arranged in the at least one further beam path (B3).

2. The interchangeable optical module (1) according to claim 1, wherein the optical module (1) further comprises a mounting structure (15) to which the beam-splitter (3), the at least one optical filter (5), and the at least one refractive element (7) are attached.

3. The interchangeable optical module (1) according to claim 2, wherein the mounting structure (15) is a cage (17)

inside which the beam-splitter (3), the at least one optical filter (5) and the at least one refractive element (7) are arranged.

4. The interchangeable optical module (1) according to claim 2, wherein the mounting structure (15) comprises at least one guiding element (23) for guiding the optical module (1) along an insertion path (I) during connection of the optical module (1) to the microscopic or endoscopic apparatus.

5. The interchangeable optical module (1) according to claim 4, wherein the at least one guiding element (23) is formed by at least one rail (25).

6. The interchangeable optical module (1) according to claim 4, wherein the insertion path (I) is perpendicular to the first beam path (B1) and the second beam path (B2) in the optical module (1).

7. A microscopic apparatus comprising at least one receptacle for receiving at least one interchangeable optical module (1) according to claim 4.

8. The interchangeable optical module (1) according to claim 1, wherein the optical module (1) further comprises at least one data storage medium (27).

9. The interchangeable optical module (1) according to claim 8, wherein the at least one data storage medium (27) is accessible from outside the optical module (1).

10. The interchangeable optical module (1) according to claim 1, wherein at least one optical component (2, 3, 5, 7) of the optical module (1) is tunable.

11. The interchangeable optical module (1) according to claim 1, further comprising additional optical elements arranged in at least one of the first beam path (B1) and the second beam path (B2) of the optical module (1).

12. A microscopic apparatus comprising:
at least two interchangeable optical modules (1) according to claim 1 having different optical properties; and
at least one receptacle for receiving a selected one of the at least two interchangeable optical modules (1).

13. The interchangeable optical module (1) according to claim 1, wherein the apparatus is a fluorescence microscope.

* * * * *